United States Patent
Bai et al.

(10) Patent No.: US 9,557,789 B2
(45) Date of Patent: Jan. 31, 2017

(54) POWER CONTROL DEVICE

(71) Applicant: Shenzhen Treasure City Technology Co., LTD., Shenzhen (CN)

(72) Inventors: Yun Bai, Shenzhen (CN); Song-Lin Tong, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 365 days.

(21) Appl. No.: 14/309,856

(22) Filed: Jun. 19, 2014

(65) Prior Publication Data
US 2014/0375143 A1 Dec. 25, 2014

(30) Foreign Application Priority Data
Jun. 19, 2013 (CN) .......................... 2013 1 02435713

(51) Int. Cl.
*H01H 31/10* (2006.01)
*G06F 1/26* (2006.01)

(52) U.S. Cl.
CPC ................ *G06F 1/26* (2013.01); *Y10T 307/76* (2015.04)

(58) Field of Classification Search
CPC .................................. G06F 1/26; Y10T 307/76
See application file for complete search history.

(56) References Cited

U.S. PATENT DOCUMENTS

2003/0215172 A1* 11/2003 Koenig .................... G01V 8/16
385/15

* cited by examiner

*Primary Examiner* — Daniel Cavallari
(74) *Attorney, Agent, or Firm* — Zhigang Ma

(57) ABSTRACT

A power control device includes a connector, a detecting module, a control module, a first output module, a second output module, a first switch module, and a second switch module. The detecting module measures a current and outputs different signals according to a comparison result between the current and a preset value. The first output module and the second output module are selectively used to supply power for the connector according to a value of the current.

9 Claims, 3 Drawing Sheets

POWER CONTROL DEVICE

FIELD

The subject matter herein generally relates to a power control device.

BACKGROUND

A motherboard supplies power for loads of different voltages via a connector.

BRIEF DESCRIPTION OF THE DRAWINGS

Implementations of the present technology will now be described, by way of example only, with reference to the attached figures.

DETAILED DESCRIPTION

Figure 1:
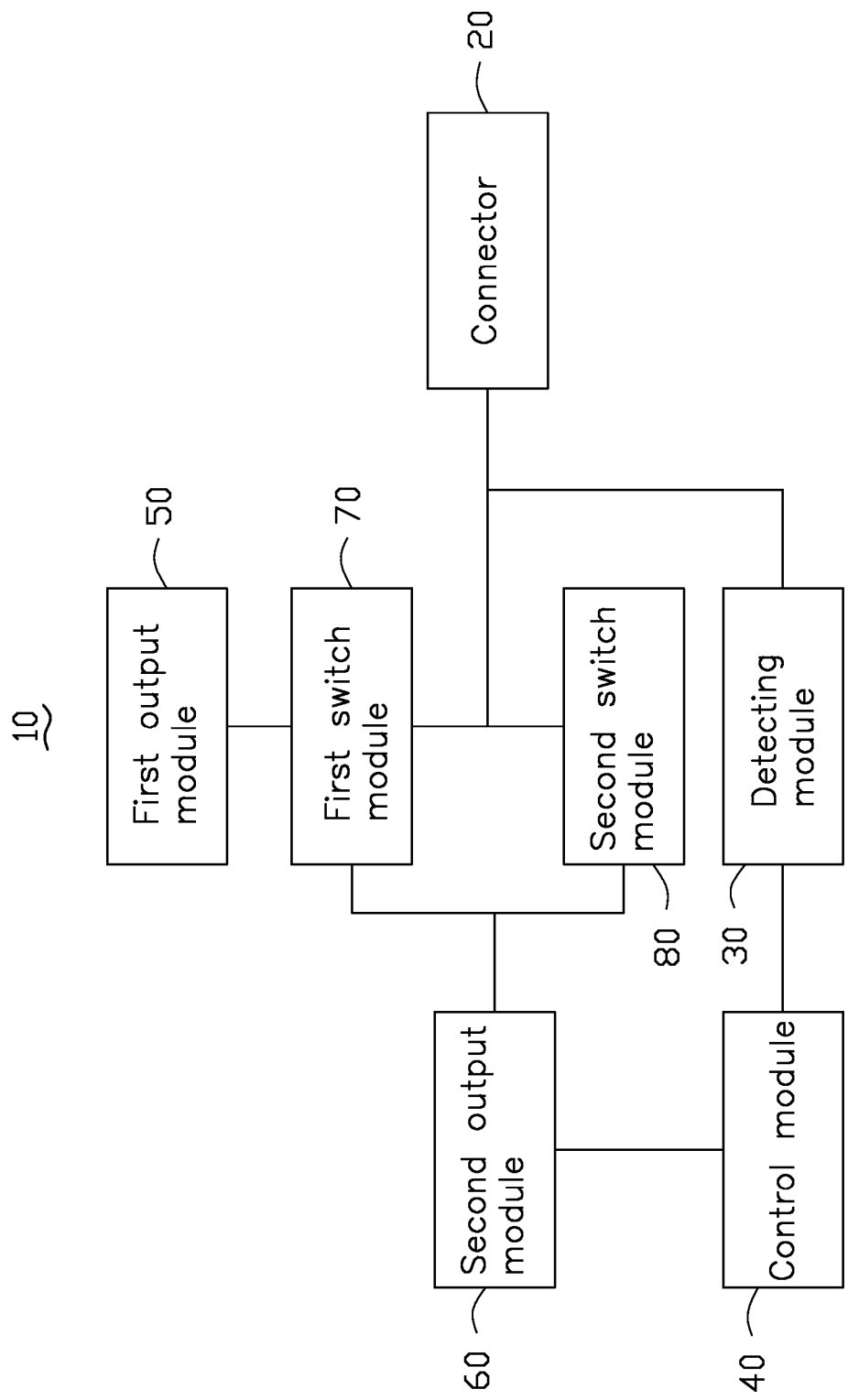
FIG. 1 is a block diagram of an embodiment of a power control device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an embodiment of a power control device 10.

FIG. 1 illustrates the power control device 10. The power control device 10 can comprise a connector 20, a detecting module 30, a control module 40, a first output module 50, a second output module 60, a first switch module 70, and a second switch module 80. The detecting module 30 is used to measure a current through the connector 20. When the current is not greater than a preset value, the detecting module 30 outputs a first signal. When the current is greater than the preset value, the detecting module 30 outputs a second signal. The control module 40 is coupled to the detecting module 30. When the control module 40 receives the first signal, the control module 40 outputs a first control signal. When the control module 40 receives the second signal, the control module 40 outputs a second control signal. The second output module 60 outputs a first enable signal when the second output module 60 receives the first control signal. The second output module 60 outputs a second enable signal when the second output module 60 receives the second control signal. The first output module 50 is coupled to the connector 20 through the first switch module 70 when the first switch module 70 receives the first enable signal. The second output module 60 is coupled to the connector 20 through the second switch module 80 when the second switch module 80 receives the second enable signal.

Figure 2:
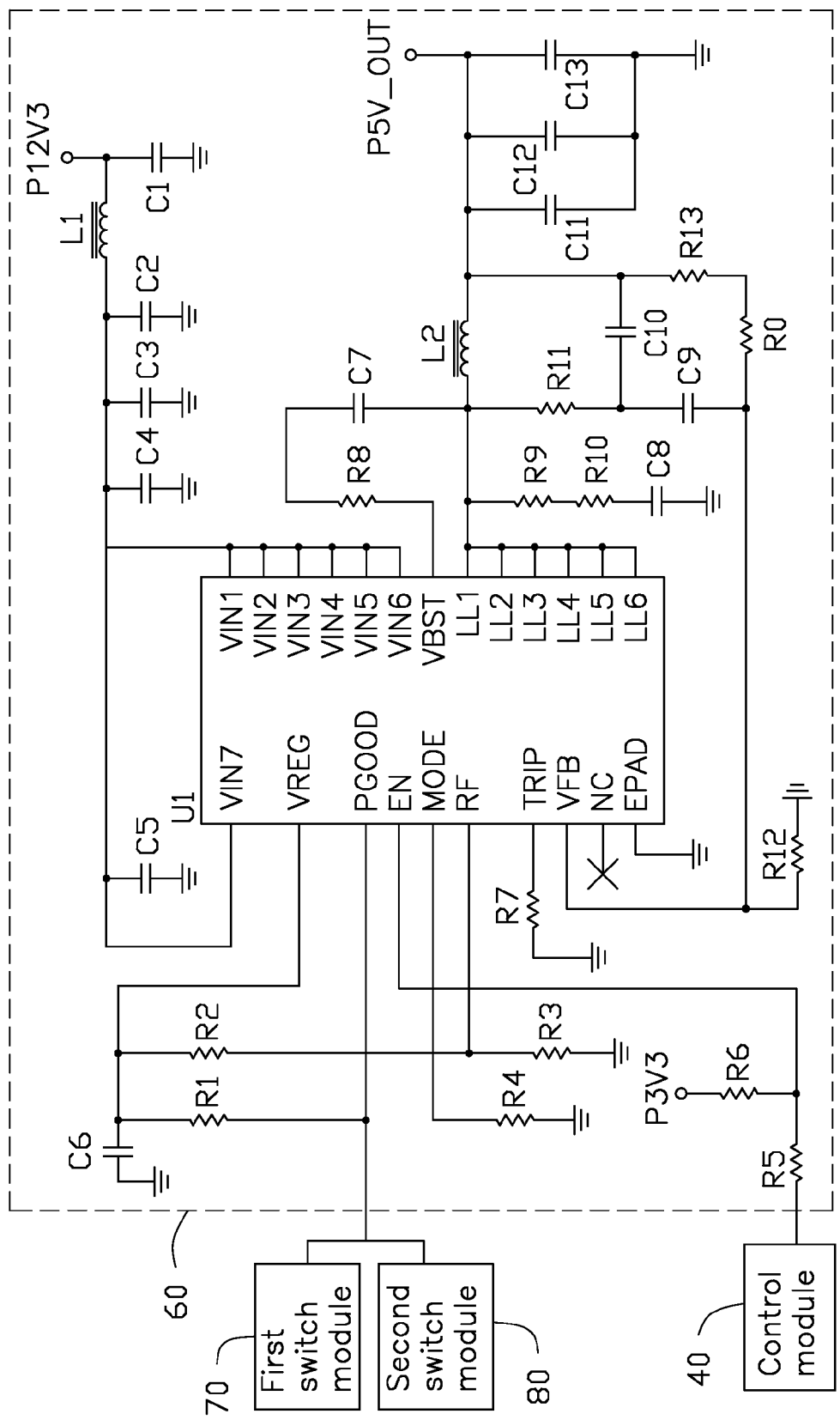
FIG. 2 is a circuit diagram of part of the power control device in FIG. 1.

FIG. 2 illustrates a circuit diagram of an embodiment of the second output module 60. The second output module 60 can comprise a chip U1, an inductor L1, an inductor L2, resistors R0-R13, and capacitors C1-C13. The chip U1 can comprise input pins VIN1-VIN7, which are coupled to a power terminal P12V3 through the inductor L1. The power terminal P12V3 is grounded through the capacitor C1. The input pin VIN1 is grounded through the capacitor C2. Capacitors C3-C5 are connected in parallel with the capacitor C2. A power pin VREG is coupled to a power good pin PGOOD through the resistor R1. The power good pin PGOOD is coupled to the first switch module 70 and the second switch module 80. The power pin VREG is grounded through the resistor R2 and the resistor R3 in that order. The power pin VREG is grounded through the capacitor C6. A mode pin MODE of the chip U1 is grounded through the resistor R4. An enable pin EN of the chip U1 is coupled to the control module 40 through the resistor R5. The enable pin EN of the chip U1 is coupled to a power terminal P3V3 through the resistor R6. An adjusting pin RF of the chip U1 is coupled to a node between the resistor R2 and the resistor R3. A temperature pin TRIP is grounded through the resistor R7. A power pin VBST of the chip U1 is coupled to an output pin LL1 of the chip U1 through the resistor R8 and the capacitor C7 in that order. Output pins LL2-LL6 are coupled to the output pin LL1. The output pin LL1 is also grounded through the resistor R9, the resistor R10, and the capacitor C8 in that order. The output pin LL1 is also grounded through the resistor R11, the capacitor C9, and the resistor R12 in that order. The output pin LL1 is coupled to a power terminal P5V_OUT through the inductor L2. The power terminal P5V_OUT is coupled to a node between the resistor R11 and the capacitor R9 through the capacitor C10. The power terminal P5V_OUT is coupled to a power pin VFB of the chip U1 through the resistor R13 and the resistor R0 in that order. The power terminal P5V_OUT is grounded through the capacitor C11. The capacitor C12 and the capacitor C13 are coupled in parallel with the capacitor C11. A float pin NC of the chip U1 is float. A ground pin EPAD of the chip U1 is grounded. The chip U1 receives the second control signal from the control module 40 through the enable pin EN. The chip U1 receives a voltage of 12V from the power terminal P12V3. The chip U1 converts the voltage of 12V into a voltage of 5V and outputs the voltage of 5V to the power terminal P5V_OUT. The chip U1 outputs the second enable signal through the power good pin PGOOD when the chip U1 receives the second control signal. The chip U1 outputs the first enable signal through the power good pin PGOOD when the chip U1 receives a first control signal. In the embodiment, the first enable signal is a low level signal, such as logic 0. The second enable signal is a high level signal, such as logic 1.

Figure 3:
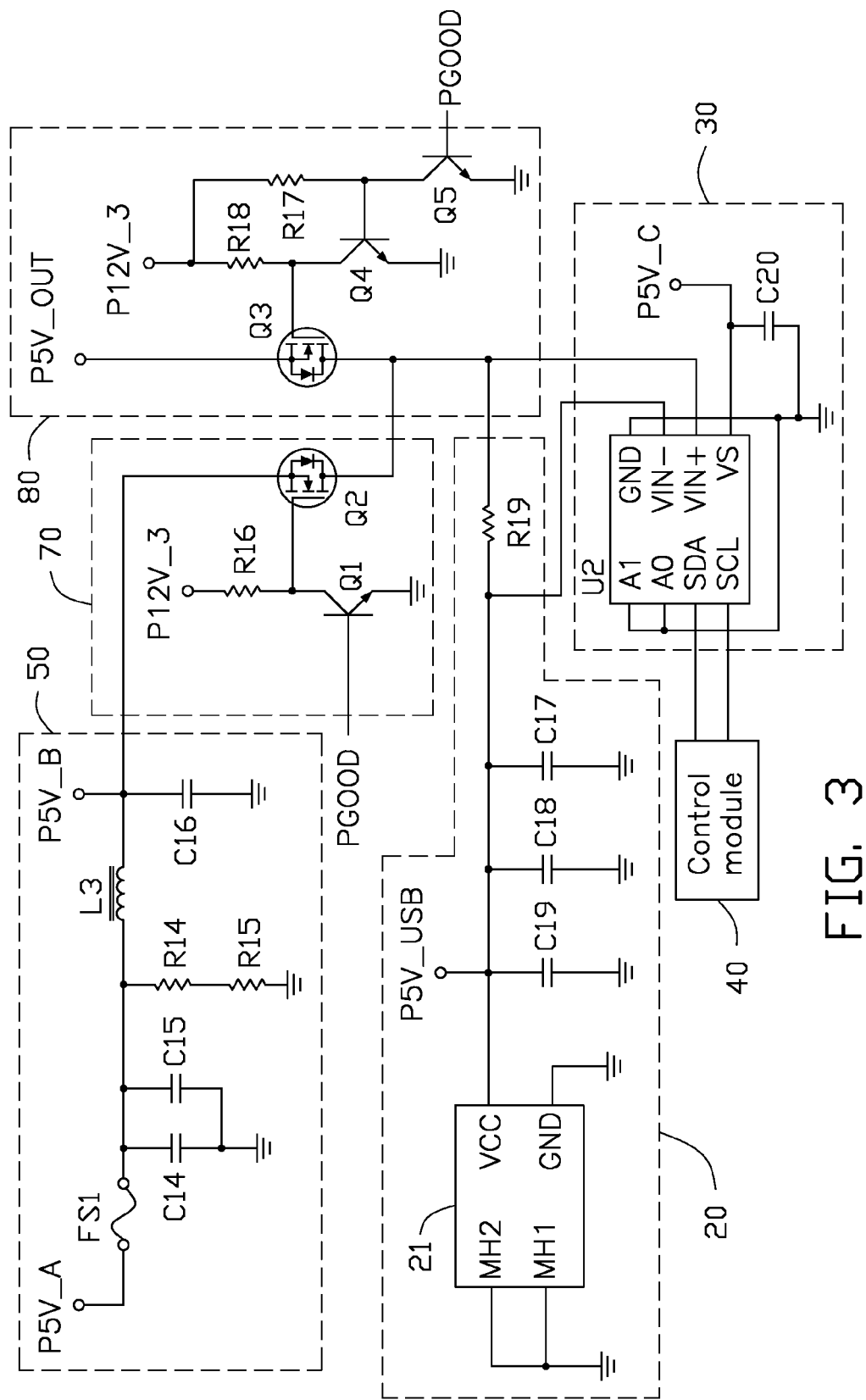
FIG. 3 is a circuit diagram of another part of the power control device in FIG. 1.

FIG. 3 illustrates a circuit diagram of an embodiment of the power control device without the second output module 60. The first output module 50 can comprise a fuse FS1, capacitors C14-C16, resistors R14-R15, and an inductor L3. A first terminal of the inductor L3 is coupled to a power terminal P5V_A through the fuse FS1. The first terminal of the inductor L3 is also grounded through the capacitor C14. The capacitor C15 and the capacitor C14 are coupled in parallel. The first terminal of the inductor L3 is grounded through the resistor R14 and the resistor R15 in that order. A second terminal of the inductor L3 is coupled to the first switch module 70 and a power terminal P5V_B. The second terminal of the inductor L3 is grounded through the capacitor C16.

The first switch module 70 can comprise an electronic switch Q1, an electronic switch Q2, and a resistor 16. A first terminal of the electronic switch Q1 is coupled to the power good pin PGOOD of the chip U1. A second terminal of the electronic switch Q1 is coupled to the power terminal P12V_3 through the resistor R16. A third terminal of the electronic switch Q1 is grounded. A first terminal of the electronic switch Q2 is coupled to the second terminal of the electronic switch Q1. A second terminal of the electronic switch Q2 is coupled to the second terminal of the inductor L3. A third terminal of the electronic switch Q2 is coupled to the second switch module 80, the detecting module 30, and the connector 20.

The second switch module 80 can comprise an electronic switch Q3, an electronic switch Q4, an electronic switch Q5, a resistor R17, and a resistor R18. A first terminal of the electronic switch Q3 is coupled to a second terminal of the electronic switch Q4. A second terminal of the electronic switch Q3 is coupled to a power terminal P5V_OUT. A third terminal of the electronic switch Q3 is coupled to the third terminal of the electronic switch Q2. A first terminal of the electronic switch Q4 is coupled to a second terminal of the electronic switch Q5. The second terminal of the electronic switch Q4 is coupled to the power terminal P2V_3 through the resistor R18. A third terminal of the electronic switch Q4 is grounded. The power terminal P12V_3 is also coupled to the first terminal of the electronic switch Q4 through the resistor R17. The power terminal P12V_3 is also coupled to the second terminal of the electronic switch Q5 through the resistor R17. A first terminal of the electronic switch Q5 is coupled to the power good pin PGOOD. A third terminal of the electronic switch Q5 is grounded.

The connector 20 can comprise a resistor 19, a capacitor C17, a capacitor C18, a capacitor C19, and a universe serial bus (USB) connector 21. A first terminal of the resistor R19 is coupled to the third terminal of the electronic switch Q2 and the third terminal of the electronic switch Q3. A second terminal of the resistor R19 is grounded through the capacitor C17. The capacitor C18 and the capacitor C19 are coupled in parallel with the capacitor C17. The second terminal of the resistor R19 is coupled to a power terminal P5V_USB. The second terminal of the resistor R19 is coupled to a power pin VCC of the USB connector 21. A ground pin MH1, a ground pin MH2, and a ground pin GND of the USB connector 21 are grounded.

The detecting module 30 can comprise a chip U2 and a capacitor C20. A ground pin GND, a ground pin A1, and a ground pin A0 of the chip U2 are grounded. A power pin VS of the chip U2 is coupled to a power terminal P5V_C. A detecting pin VIN+ is coupled to the first terminal of the resistor R19. A detecting pin VIN− is coupled to the second terminal of the resistor R19. A data pin SDA of the chip U2 and a clock pin SCL of the chip U2 are coupled to the control module 40. The capacitor C20 is coupled between the power pin VS of the chip U2 and ground.

In use, the second output module 60 outputs a low level signal, such as logic 0, through the power good pin PGOOD by default. The first terminal of the electronic switch Q1 receives the low level signal. The electronic switch Q1 is deactivated. The power terminal P12V_3 is coupled to the first terminal of the electronic switch Q2 through the resistor R16. The electronic switch Q2 is activated. The first output module supplies power to the USB connector 21 through the electronic switch Q2. The first terminal of the electronic switch Q5 is at a low level. The electronic switch Q5 is deactivated. The power terminal P12V_3 is coupled to the first terminal of the electronic switch Q4 through the resistor R17. The electronic switch Q4 is activated. A first terminal of the electronic switch Q3 is at a low level. The electronic switch Q3 is deactivated. The second output module 60 cannot supply power to the USB connector 21 through the second switch module 80.

The chip U2 measures a voltage across the resistor R19. When the voltage is not greater than a preset value, the chip U2 outputs a first signal to the control module 40. The control module 40 outputs a first control signal to the enable pin EN of the chip U1. The chip U1 receives the first control signal and outputs the first enable signal through the power good pin PGOOD. The first enable signal is at a low level. When the voltage is greater than the preset value, the chip U2 outputs a second signal to the control module 40. The control module 40 output a second control signal to the enable pin EN of the chip U1. The chip U1 receives the second control signal and outputs a second enable signal through the power good pin PGOOD. The second enable signal is at a high level.

When the chip U1 outputs the second enable signal through the power good pin PGOOD, the first terminal of the electronic switch Q1 is at a high level and the electronic switch Q1 is activated. The power terminal P12V_3 is grounded through the resistor R16. A first terminal of the electronic switch Q2 is at a low level. The electronic switch Q2 is deactivated. The first output module 50 cannot supply power to the USB connector 21 through the electronic switch Q2. The first terminal of the electronic switch Q5 is at a high level and the electronic switch Q5 is activated. The power terminal P12V_3 is grounded through the resistor R17. The electronic switch Q4 is deactivated. A first terminal of the electronic switch Q3 is at a high level. The electronic switch Q3 is activated. The second output module 60 supplies power to the USB connector 21 through the electronic switch Q3.

In the embodiment, the control module is a basic input output system. The first output module 50 can provide a current with a maximum of 500 MA. The second output module 60 can provide a current with a maximum of 5 A.

In the embodiment, the electronic switch Q1, the electronic switch Q4, and the electronic switch Q5 are NPN transistors. The electronic switch Q2 and the electronic switch Q3 are n-channel field effect transistors.

The embodiments shown and described above are only examples. Many details are often found in the art such as the other features of a power control device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power control device comprising:
  a connector;
  a detecting module configured to detect a current through the connector, the detecting module further configured to output a first signal when the current is not greater than a preset value and output a second signal when the current is greater than the preset value;
  a control module coupled to the detecting module, the control module configured to output a first control signal when the control module receives the first signal and output a second control signal when the control module receives the second signal;
  a first output module and a second output module, the second output module coupled to the control module and configured to output a first enable signal when the second output module receives the first control signal, the second output module configured to output a second enable signal when the second output module receives the second control signal; and
  a first switch module and a second switch module coupled to the connector, wherein the first switch module is coupled to the first output module and the second output module, the first switch module couples the first output module to the connector when the first switch module receives the first enable signal, the second switch module is coupled to the second output module, and the second switch module couples the second output module to the connector when the second switch module receives the second enable signal.

2. The power control device of claim 1, the second output module comprising a first chip, a first inductor, a second inductor, first through fourth resistors, and first through thirteen capacitors, first through sixth input pins and a first power pin of the first chip both coupled to a first power input terminal through the first inductor, the first power input terminal grounded through the first capacitor, the first power pin of the chip grounded through the second capacitor, wherein the third capacitor, the fourth capacitor, and the fifth capacitor are coupled in parallel with the second capacitor, a second power pin of the first chip is coupled to a power good pin of the first chip through the first resistor, the second power pin of the first chip is grounded through the second resistor and the third resistor in that order, the second power pin of the first chip is grounded through the sixth capacitor, a mode pin of the first chip is grounded through the fourth resistor, an enable pin of the first chip is coupled to the control module through the fifth resistor to receive the first control signal or the second control signal, the enable pin of the first chip is also coupled to a second power terminal through the sixth resistor, an adjusting pin of the first chip is coupled to a node between the second resistor and the third resistor, a temperature pin of the first chip is grounded through the seventh resistor, a third power pin of the first chip is coupled to a first output pin of the first chip through the eighth resistor and the seventh capacitor in that order, second through sixth output pins of the first chip are coupled to the first output pin of the first chip, the first output pin of the first chip is grounded through the ninth resistor, the tenth resistor, and the eighth resistor in that order, the first output pin of the first chip is grounded through the eleventh resistor, the ninth capacitor, and the twelfth resistor in that order, the first output pin of the first chip is coupled to a first power output terminal through the second inductor, the first power output terminal is coupled to a node between the eleventh resistor and the ninth capacitor through the tenth capacitor, the first power output terminal is grounded through the thirteen resistor, the fourteen resistor, and the twelfth resistor in that order, the first power output terminal is grounded through the eleventh capacitor, the twelfth capacitor and the thirteen capacitor are coupled in parallel with the eleventh capacitor, the first chip receives a first voltage from the first power input terminal when the first chip receives the second control signal and converts the first voltage into a second voltage, the first chip outputs the second voltage to the first power output terminal, the first chip outputs a second enable signal through the power good pin when the first chip receives the second control signal, and the first chip outputs a first enable signal through the power good pin when the first chip receives the first control signal.

3. The power control device of claim 2, wherein the first output module comprises a fuse, fourteen through sixteen capacitor, a fourteen resistor, a fifteen resistor, and a third inductor, a first terminal of the third inductor is coupled to a second power input terminal through the fuse, the first terminal of the third inductor is grounded through the fourteen capacitor, the fifteen capacitor is coupled to the fourteen capacitor in parallel, the first terminal of the third inductor is grounded through the fourteen resistor and the fifteen resistor in that order, a second terminal of the third inductor is coupled to a third power input terminal and the first switch module, the second terminal of the third inductor is grounded through the sixteen capacitor.

4. The power control device of claim 3, wherein the first switch module comprises a first electronic switch, a second electronic switch, and a sixteen resistor, a first terminal of the first electronic switch is coupled to the power good pin of the first chip, the second terminal of the first electronic switch is coupled to a fourth power input terminal through the sixteen resistor, a third terminal of the first electronic switch is grounded, a first terminal of the second electronic switch is coupled to the second terminal of the first electronic switch, a second terminal of the second electronic switch is coupled to the second terminal of the third inductor, a third terminal of the second electronic switch is coupled to the second switch module, the detecting module, and the connector.

5. The power control device of claim 4, wherein the first electronic switch is an NPN transistor, the second electronic switch is an n-channel filed effect transistor.

6. The power control device of claim 5, wherein the second switch module comprises a third electronic switch, a fourth electronic switch, a fifth electronic switch, a seventeen resistor, and an eighteen resistor, a first terminal of the third electronic switch is coupled to a second terminal of the fourth electronic switch, a second terminal of the third electronic switch is coupled to the first power output terminal, a third terminal of the third electronic switch is coupled to the third terminal of the second electronic switch, a first terminal of the fourth electronic switch is coupled to a second terminal of the fifth electronic switch, a second terminal of the fourth electronic switch is coupled to the fourth power input terminal through the eighteen resistor, a third terminal of the fourth electronic switch is grounded, the eighteen resistor is coupled to the fourth power input terminal, a third terminal of the fourth electronic switch is grounded, the fourth power input terminal is also coupled to the first terminal of the fourth electronic switch through the seventeen resistor, the fourth power input terminal is also coupled to the second terminal of the fifth electronic switch, the first terminal of the fifth electronic switch is coupled to the power good in of the first chip, the third terminal of the fifth electronic switch is grounded.

7. The power control device of claim 6, wherein the fourth electronic switch and the fifth electronic switch are NPN transistors, the third electronic switch is a n-channel filed effect transistor.

8. The power control device of claim 7, wherein the connector comprises a nineteen resistor, a seventeen capacitor, an eighteen capacitor, a nineteen capacitor, and a universal serial bus connector, a first terminal of the nineteen resistor is coupled to the third terminal of the second electronic switch and the third terminal of the third electronic switch, a second terminal of the nineteen resistor is grounded through the seventeen capacitor, the eighteen capacitor and the nineteen capacitor are coupled in parallel with the seventeen capacitor, the second terminal of the nineteen resistor is coupled to a fifth power input terminal, the second terminal of the nineteen resistor is coupled to a power pin of the universal serial bus connector.

9. The power control device of claim 8, wherein the detecting module comprises a second chip and a twentieth capacitor, ground pins of the second chip are grounded, a power pin of the second chip is coupled to a sixth power input terminal, a first detecting pin is coupled to the first terminal of the nineteen resistor, a second detecting pin is coupled to the second terminal of the nineteen resistor, a data pin of the second chip is coupled to the control module, a clock pin of the second chip is coupled to the control module.

* * * * *